Jan. 4, 1966   W. LEIBIG   3,227,582
APPARATUS FOR EXTRACTION FROM PLANT MATERIALS
Filed Oct. 23, 1963   2 Sheets-Sheet 2

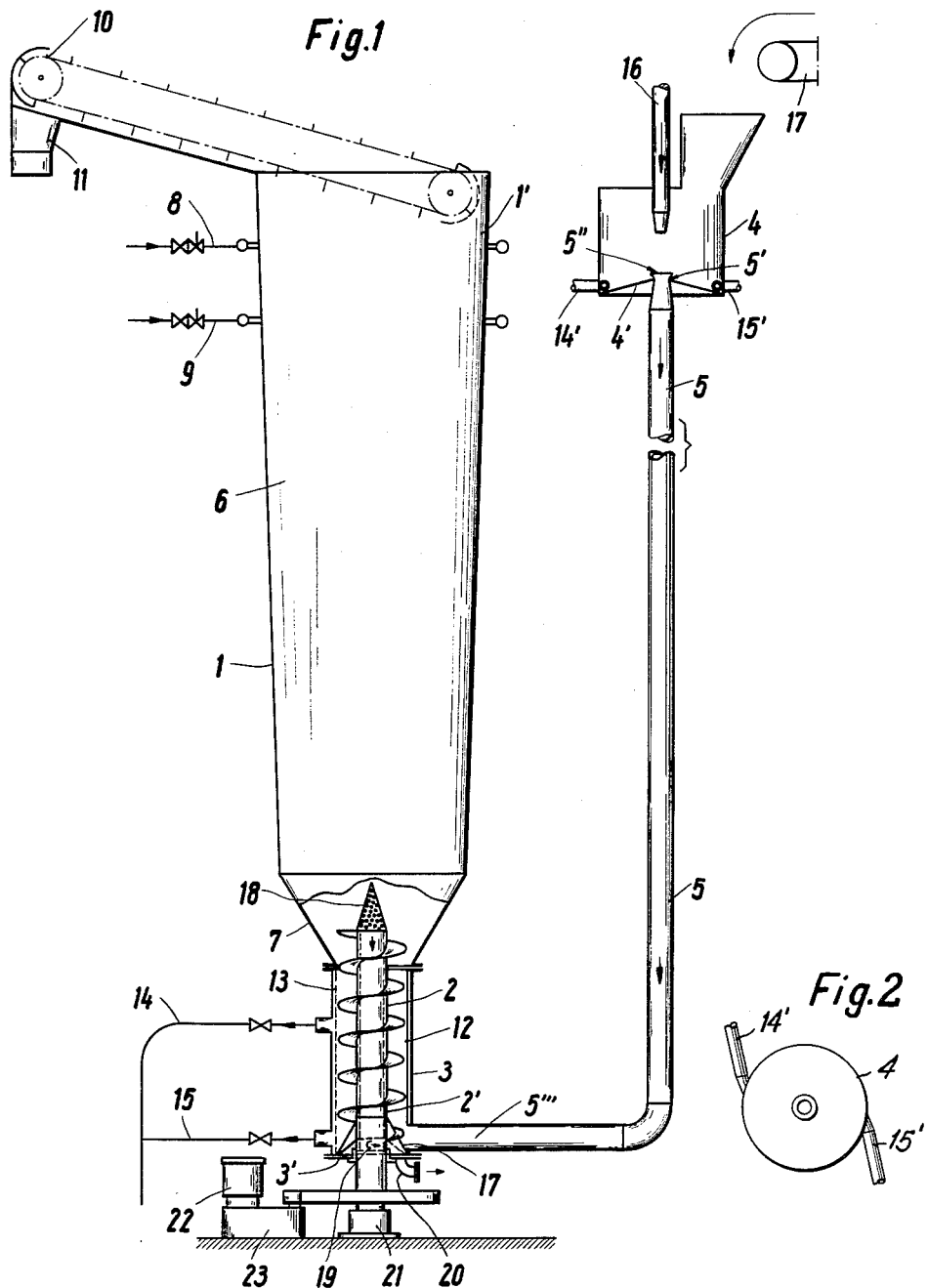

Inventor:

United States Patent Office 3,227,582
Patented Jan. 4, 1966

3,227,582
APPARATUS FOR EXTRACTION FROM
PLANT MATERIALS
Willy Leibig, Hda Casa Grande, Peru, assignor to
Braunschweigische Maschinenbauanstalt, Braunschweig, Germany
Filed Oct. 23, 1963, Ser. No. 318,290
Claims priority, application Germany, Oct. 27, 1962,
B 69,398
2 Claims. (Cl. 127—7)

This invention relates to diffusion installations for extraction from comminuted vegetable substances, for example for the extraction of sugar from shredded sugar cane. The installation comprises an unobstructed diffusion tower having a supply pipe entering its base for the supply of extraction material which is forced into the tower by a feed screw and having an extraction liquid supply pipe at the top end of the tower and, at the bottom end thereof, discharge pipe, covered by screens, for raw and circulating juice.

Diffusion installations having an unobstructed diffusion tower of the kind described are known for extracting sugar from reduced sugar beet slices; the beet slices are supplied to a tank which precedes the tower and are forced into the bottom part of the diffusion tower through a supply pipe and through a rotating feed screw disposed horizontally in a cylindrical widened part of the supply pipe. The slices move in the tower in countercurrent to the extraction liquid supplied at the top end of the tower and ascend, and they leave the tower at the top either via a top overflow or through a suitable scoop mechanism, while the raw and circulating juice is discharged from the bottom end of the tower. In another known diffusion installation of this kind, a pump for conveying the slices through the tower is provided between the bottom end of the diffusion tower and a mixing screw disposed horizontally in the pipe for supplying the slices. It has already been suggested that unobstructed tower diffusers of the kind described be used for the extraction of reduced sugar cane. However, it has been impossible to do this because the known installations and the associated conveyors cannot provide continuous conveyance through the tower diffuser of comminuted and, more particularly shredded, sugar cane to the extent of filling required for diffusion, mainly because shredded sugar cane, owing to its fibrous structure, tends particularly to form lumps or clots which lead to the tower tank being charged unevenly, with the result that extraction is inadequate. Also, it is very difficult to convey shredded sugar cane to the diffusion tower because the hard sugar-cane fibres cause heavy wear of the conveying elements and cause frequent jamming by winding round different parts and by their tendency to form lumps. This applies even more to the known extraction towers having continuous conveyors on built-in brackets, and so they cannot be used for the extraction of shredded sugar cane.

It is an object of the invention to provide an extraction installation which comprises an unobstructed diffusion tower and which, in contrast to the known installations, can be used for continuous and operationally satisfactory extraction of comminuted, more particularly shredded, sugar cane.

According to this invention, starting from a diffusion installation of the kind specified, the feed screw for the extraction material is disposed vertically in a conveying shaft which is connected to the bottom of the diffusion tower by a funnel-shaped part which widens out from the shaft to the tower and the feed screw has its upper worm threads extending into the funnel-shaped part and a pipe through which the extraction material mixed with circulating juice is supplied to the tower opens laterally into the bottom part of the conveying shaft.

Consequently, and as has already been confirmed in practice, the extraction material mixed with circulating juice—i.e., more particularly shredded sugar cane—can be forced with surprisingly uniform distribution into the unobstructed diffusion chamber of the tower by the feed screw disposed vertically in the conveying shaft; once in the diffusion tower, the sugar cane forms layers continuously and moves upwards, in a loose and uniformly divided condition, in countercurrent to the flow of diffusing liquid, so that thorough extraction is provided. Of course, if the sugar cane forced out of the conveying tunnel by the feed screw therein is to be uniformly divided, the top part of the feed screw must extend into the funnel-shaped widened part of the tower, for then the sugar cane fibres can disengage laterally upwards in this widened part from the top end of the feed screw and therefore uniformly fill the whole cross-section of the diffusion chamber above.

For improved deflection of the extraction liquid which is mixed with circulating liquid and which enters the bottom end of the conveying tunnel, and to inhibit any build-up in the reduced sugar cane on the receiving part of the feed screw effectively, the feed screw shaft is thickened conically in the bottom part disposed at the level of the extraction material supply pipe, so that the feed screw shaft is, immediately above the conveying tunnel base, of the same diameter as the feed screw. This step has been found very important in practice; in its absence, the reduced sugar cane may pile up or form lumps between the bottom end of the feed screw and the conveying tunnel base.

According to another feature of the invention, discharge pipes covered by screens are connected to the conveying shaft side wall and extend to a mixing tank which is disposed at the same height as the top end of the tower and which is connected to the bottom end of the tower through a supply pipe and which receives in this zone the extraction material for mixing with circulating juice. An important feature in this connection is that the supply pipe extending to the bottom end of the tower leads from the centre of the base of the mixing tank, and the, or each, pipe bringing the circulating juice from the tower enters the mixing tank tangentially. The tangential inflow of circulating juice above the tank base therefore rotates the shredded sugar cane supplied, and so not only is the juice thoroughly mixed but also, and more important, the entry of this mixture into the supply pipe which extends to the bottom end of the tower and which leads from the centre of the mixing tank base is considerably improved or simplified. As an optional feature, a pump can be provided in the supply pipe extending from the mixing tank to the diffusion tower, to accelerate the delivery of the juice and sugar cane mixture.

An example of a diffusion installation in accordance with the invention is illustrated in the accompanying drawings in which:

FIGURE 1 is a partly sectional diagrammatic side view of the complete installation;

FIGURE 2 is an underneath plan view of a mixing tank which precedes the diffusion tower; and, FIGURE 3 is a partly sectional side view to a large scale of the vertical feed screw in the bottom end of the tower.

Figure 3:
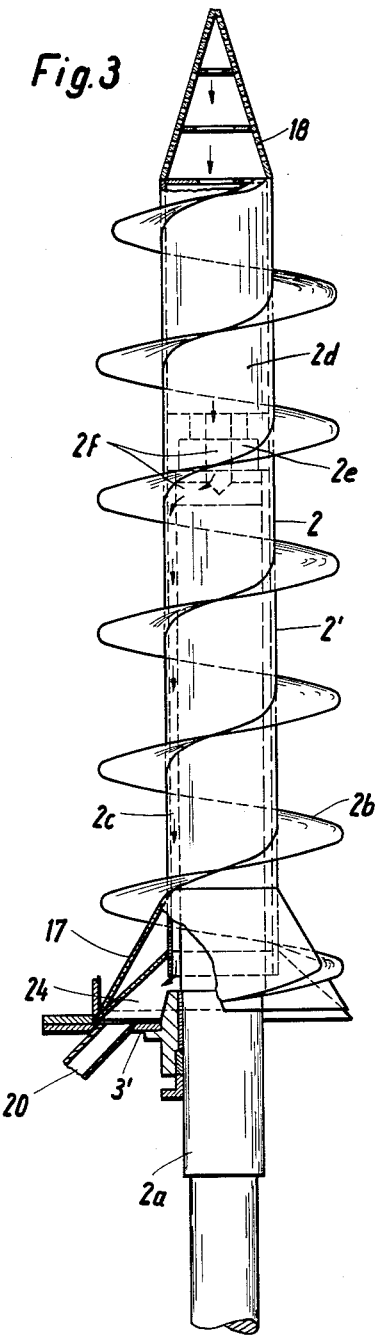

The diffusion installation which is illustrated in FIGURE 1 and which is intended for the extraction of shredded sugar cane comprises unobstructed diffusion tower 1 having at its bottom end a reduced-diameter conveying shaft 3 containing a vertical feed screw 2; disposed at the level of the top end of the tower is a mixing tank 4 connected by a pipe 5 of relatively large cross-section, to the bottom end of the conveying shaft 3. That part of the tower which contains the unobstructed diffusion chamber 6 widens slightly conically upwards. Between the cylindrical shaft 3 and the diffusion chamber 6 is a conically widened tower part 7 into which the top end of the feed screw 2 extends. Supply pipes 8 and 9 for the extracting liquid, generally water, open into the top end 1' of the tower. Also provided at the same end is a scraper conveyor 10 which removes the extracted sugar cane from the top end 1' of the tower and supplies the extracted cane to a fall shaft 11 for further processing.

Disposed in the bottom part of the diffusion tower on the side wall of the shaft 3 are helical or longitudinal retaining strips 12 to ensure that the extraction material is conveyed vertically on the inner surface of the shaft 3. Also provided in this region are circulation juice discharge pipes 14, 15 which are covered by screens 13. The pipes 14, 15 extend to the mixing tank 4 at the level of the top end 1' of the tower, and they enter the mixing tank base tangentially, as can be seen in FIGURE 2. In contrast, however, the pipe 5 extending to the bottom end of the shaft 3 departs from the centre of the slightly conically drawn-in base of the tank 4 so that the discharge port (5') of the pipe 5 has a widening edge 5'' extending beyond the bottom 4' of the tank 4. Above the port 5' another supply pipe 16 for circulating liquid enters the tank 4 with a nozzle. Shredded sugar cane is supplied to the mixing tank 4 by an endless conveyor belt 17' or some other appropriate supply device.

The feed screw 2 disposed in the shaft 3 has in its bottom part, which is at the level of the extraction material supply pipe 5''', a conical part 17 which starts at the periphery of the screw shaft 2' and which widens downwards and which runs out into the bottom feed screw thread. The part 17 is disposed immediately above the base 3' of the shaft 3. The feed screw shaft 2' is hollow, for removal of the raw juice, and has, at its top end which extends into the funnel-shaped widened part 7 of the tower, a screening cone 18 for the raw juice to pass through. The raw or factory juice passes out through an aperture 19 in the feed screw shaft surface 2', this aperture being below the conical portion 17, whereafter the juice can be passed on for further processing through a discharge port 20 branching from the shaft base 3'. The feed screw has two sets of bearings, in the base 3' and in a bottom foundation base 21, and is rotated by a motor 22 through a transmission 23 which engages with that part of the feed screw disposed between the two bearings.

One particularly advantageous embodiment of the feed screw is illustrated in FIGURE 3 where the feed screw 2 mainly comprises: a feed screw core shaft 2a which extends through the shaft base 3' and which transmits the drive, and the shaft jacket 2' which is disposed on, and, engages with clearance around, the core 2a and which carries the feed screw threads 2b. The shaft jacket 2' co-operates with the core 2a to bound an annular juice discharge channel 2c which extends to a chamber 24 disposed below the conical portion 17 of the feed screw and above the base 3'. The raw juice discharge port 20 branches off the chamber 24. The raw juice passes through the screening cone 18 at the top of the feed screw 2. This cone extends into the conical widened part 7 of the tower 1, then enters a collecting chamber 2d at the top of the shaft part 2', then flows through channels 2f placed at the junction 2e between the shaft part 2' and the shaft core 2a into the annular channel 2c, then leaves the tower interior via the chamber 24 and the port 20.

The diffusion installation operates as follows:

The reduced, preferably just shredded, sugar cane is supplied by the conveyor belt 17' to the mixing tank 4, while the circulation juice removed from the bottom end of the tower is introduced through nozzles into the tank 4 via the tangential pipes 14', 15' and, if required, through the top entry pipe 16. The rotation of the mixture in the tank 4 caused by the part-tangential entry of the circulating juice helps the floating or pumpable mixture to flow away into the pipe 5 via the central orifice 5' in the tank base 4'. The mixture descends through the pipe 5, which can if required have a pump, to the bottom part of the diffusion tower and enters the shaft 3 immediately above the base 3'. Because of the conical part 17, the reduced sugar cane which enters via the port 5''' is transferred to the feed screw 2 in such a way that no blockages occur because no sugar cane fibres can enter the part which is below the conical part 17 and above the shaft base 3', in the manner which might otherwise occur. The material for extraction is then conveyed by the feed screw 2 into the diffusion chamber 6 of the tower 1. Since the extraction material is supplied continuously, there is a continuous lamination effect in the chamber 6 so that the extraction material is conveyed uniformly through the tower; an important factor in this connection is that, since some of the feed screw 2 extends into the conical widened part 7 of the tower 1, the sugar cane which, when it first reaches the shaft 3, is still very compressed or bunched, is loosened satisfactorily in the part 7 and distributed uniformly over the cross-section of the diffusion chamber. This effect is due to the special form of co-operation between the top end of the screw and the tower walls which are appropriately set back in the conical part 7.

The extraction liquid, generally water, which is supplied through the pipes 8, 9 and which flows in countercurrent to the extraction material provides an effective washing of the ascending reduced sugar cane—i.e., its sugar juice contents increase. The washed sugar cane is removed at the top end 1' of the tower, immediately below the liquid level, by the scraper conveyor 10 or other known delivery devices, but the raw juice which flows to the factory for further processing is removed via the screening cone 18 of the hollow feed screw shaft 2. Since the screening cone 18 is disposed in the diffusion chamber where the relatively considerable filling of extraction material substantially precludes any transport of finely divided sugar cane with the juice—i.e., where there is substantially a filter effect—the cone 18 remains substantially unblocked. Another factor which helps in this connection is that there is a difference between the speed of the cone 18, which rotates with the shaft 2, and the reduced extraction material, and this speed difference ensures that the surface of the screen 18 is cleaned continuously, and so there is substantially no risk of the screen becoming blocked. Another portion of the juice is removed as circulation juice through the pipes 14, 15 and through the screens in the shaft 3; after appropriate heating, this circulation juice is returned to the tank 4 and used to prepare and introduce into the diffusion installation the reduced sugar cane which it is required to extract.

Of course, many variations are possible within the scope of this invention. For instance, the effective screening areas for the circulation and factory juice can be increased appropriately by providing extra screens in the hollow feed screw shaft or in the hollow screw threads thereof. Similarly, the diffusion tower can be cylindrical throughout its diffusion part, although it preferably widens conically upwards since this feature greatly reduces friction between the extraction material and the tower wall and therefore facilitates upwards conveyance of the extraction material.

I claim:
1. Diffusion installation for extracting comminuted vegetable material such as shredded sugar cane, comprising a diffusion tower free of interior obstructions and having an inlet at the bottom end thereof for comminuted vegetable material supplied thereto, a conveyor screw located in said tower adjacent said bottom inlet for upwardly advancing vegetable material supplied through said bottom inlet, extraction liquid inlet means located at the top of said tower for supplying extraction liquid to said tower for contacting the vegetable material therein, outlet means located at the bottom of said tower for discharging juice formed from the extraction liquid and the extract of the vegetable material, screening means for blocking the discharge of the vegetable material from said outlet means, and mixing tank means for mixing the comminuted vegetable material with a portion of the juice discharged from said tower, said mixing tank means being connected with said bottom inlet for supplying the comminuted vegetable material mixed with juice to said tower, said diffusion tower comprising an elongated top portion, a bottom portion of reduced cross section forming a conveyor shaft surrounding said conveyor screw, and an intermediate conical portion tapering from said top portion to said bottom portion, said conveyor screw comprising a shaft core and a cylindrical jacket surrounding said shaft core in spaced relation thereto so as to form an annular passage therebetween, said cylindrical jacket having a peripheral helical screw thread of uniform diameter terminating at the upper end thereof in a perforated conical dome extending into said intermediate conical portion of said tower and having a funnel-shaped skirt at the lower end thereof, said conveyor shaft having a bottom wall defining with said funnel-shaped skirt around said shaft core an annular collecting space for juice passing through said perforated conical dome and said annular passage.

2. Diffusion installation according to claim 1 wherein said juice discharging outlet means comprises at least one conduit extending from said conveyor shaft and connecting with said mixing tank means at a location adjacent the bottom end thereof and substantially tangential to said mixing tank means for supplying a portion of the discharged juice thereto for mixing with comminuted vegetable material contained therein.

References Cited by the Examiner
UNITED STATES PATENTS

| | | | |
|---|---|---|---|
| 934,349 | 9/1909 | Philipp | 127—7 X |
| 1,028,650 | 6/1912 | Wolff | 127—7 X |

FOREIGN PATENTS

| | | |
|---|---|---|
| 56,869 | 12/1912 | Austria. |

MORRIS O. WOLK, *Primary Examiner.*